US012639688B2

(12) United States Patent
Wilk, Jr.

(10) Patent No.: US 12,639,688 B2
(45) Date of Patent: May 26, 2026

(54) SERVER RACK MOUNTABLE AUTOMATED TEST PLATFORM FOR TRANSACTION DEVICE TESTING

(71) Applicant: Disney Enterprises, Inc., Burbank, CA (US)

(72) Inventor: Thomas Anthony Wilk, Jr., Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 809 days.

(21) Appl. No.: 18/094,491

(22) Filed: Jan. 9, 2023

(65) Prior Publication Data

US 2024/0232845 A1 Jul. 11, 2024

(51) Int. Cl.
*G06Q 20/20* (2012.01)
*B25J 11/00* (2006.01)

(52) U.S. Cl.
CPC ............ *G06Q 20/204* (2013.01); *B25J 11/00* (2013.01); *G06Q 20/208* (2013.01)

(58) Field of Classification Search
CPC ...... G06Q 20/204; G06Q 20/208; B25J 11/00
USPC ........................................ 235/7 R
See application file for complete search history.

(56) References Cited

U.S. PATENT DOCUMENTS

| | | | | |
|---|---|---|---|---|
| 5,827,983 A | * | 10/1998 | Ortoli ..................... | G06F 11/26 |
| | | | | 714/E11.159 |
| 2001/0015641 A1 | * | 8/2001 | Swart ................. | G01R 1/06705 |
| | | | | 324/763.01 |
| 2011/0035179 A1 | * | 2/2011 | Tao ........................ | G06F 11/006 |
| | | | | 707/600 |
| 2024/0133906 A1 | * | 4/2024 | Li ........................ | H05K 1/0286 |

OTHER PUBLICATIONS

Abrantix, "Test Automation Products—Robots" (2022) 2 pages, accessed at https://www.abrantix.com/en/products-robots.html.

* cited by examiner

*Primary Examiner* — Daniel A Hess
(74) *Attorney, Agent, or Firm* — Foley & Lardner LLP

(57) ABSTRACT

An automated test platform configured for use in testing and validating point of sale (POS) software and hardware. The platform is designed for mounting within shelf or drawer of a conventional server rack to enhance the safety and security of using the automated test platform, and a test system may include a plurality of server racks filled with dozens of the automated test platforms to concurrently test numerous terminals. The platform includes robotic or mechanical systems to perform EMV (Europay, Mastercard, and Visa) card inserts, swipes, and tap transactions on a payment or transaction terminal undergoing testing. The platform utilizes a robotic system that performs PIN (personal identification number) entry and button pressing on the touch screen of the payment or transaction terminal. The platform has capabilities of automating tests that require use of barcode scans and simulated network and/or device outages.

22 Claims, 12 Drawing Sheets

220

PAYMENT TERMINAL, 101

PIN ENTRY ASSEMBLY, 250

CARD TAP TO PAY ASSEMBLY, 240

CARD SWIPE EMULATOR ASSEMBLY, 270

CARD INSERT ASSEMBLY, 230

110

900

1000

1100

SERVER RACK MOUNTABLE AUTOMATED TEST PLATFORM FOR TRANSACTION DEVICE TESTING

CROSS-REFERENCE TO RELATED APPLICATION

This application claims priority to U.S. Provisional Pat. Appl. No. 63/410,145, filed on Sep. 26, 2022, which is incorporated by reference herein as if set forth in full.

BACKGROUND

1. Field of the Description

The present invention relates, in general, to automated testing of transaction terminals or devices, and, more particularly, to systems and methods for automating the testing of point of sale (POS) terminals that are each configured to support multiple modes of user input.

2. Relevant Background

In recent years, point of sale (POS) systems have become ubiquitous in retail and other settings, and these POS systems may be referred to by many names including point of purchase (POP) systems, retail management systems, and the like. An important part of these systems are terminals (e.g., POS terminals) that implement communication interface standards for communicating with backend systems that handle transactions with financial institutions, security systems, inventory systems, and the like. Transaction terminals also implement user interface components to receive manually entered information, such as chip readers, magnetic stripe readers, quick response (QR) and bar code readers, and the like, as well as human input components, such as mechanical and touchscreen keypads. As technology evolves, additional user interface components and technologies are used to improve functionality and security of these transaction terminals.

POS terminals implement a wide variety of communication interfaces and user interfaces that are continuously evolving. Any given environment may have multiple different terminal types from a variety of manufacturers that implement different sets of communication interfaces and user interfaces. Moreover, POS devices are frequently updated to improve functionality and security and to implement bug fixes. As a result, there is a significant ongoing need for testing POS and other transaction terminals (or devices) in conjunction with updates.

Terminal testing, however, is complicated when there are a variety of form factors and user interfaces. A seemingly minor update to a communication interface may create an unexpected behavior in a user interface component. That unexpected behavior may be unique to a particular user environment and can only be identified with rigorous testing of the terminals. However, because the user interfaces are designed for human operators, much of this testing has in the past required teams of human testers manually operating the terminals over hundreds or thousands of transaction types to validate even simple changes. This testing has proven to be time consuming, expensive, and error prone. Accordingly, there is an ongoing demand for improved automated testing of POS and other transaction terminals that supports multiple modes of user input.

SUMMARY

The present invention addresses the above problems by providing a robotic automation platform (or "automated test platform") that is configured for use in testing and validating POS software and hardware or "transaction terminals" or "POS terminals" (or devices). Each platform is designed specifically to be mounted within a conventional server rack (e.g., is rack mountable) to enhance the safety and security of using the automated test platform, and a test system can be operated that includes a plurality of server racks filled with several to dozens of the automated test platforms to concurrently test numerous transaction terminals.

In some prototypes, the automated test platform has been shown to have the capability of executing six hundred test cases in a day compared to a manual tester (or human operator) who can execute an average of sixty test cases in a day, which provides ten times increase in productivity. The test platform accomplishes this by using mechanical systems to perform EMV (Europay, Mastercard, and Visa) card inserts, swipes, and tap transactions on a payment or transaction terminal undergoing testing. The automated test platform is compatible with a wide variety of POS payment terminals due to its configurable design. The platform also utilizes a robotic system that performs PIN (personal identification number) entry and button pressing on the touch screen of the payment or transaction terminal. Additionally, the new platform has capabilities of automating tests that require use of barcode scans and simulated network and/or device outages, which was not possible with prior testing machines.

More particularly, an automated test platform is described herein that is designed for testing point of sale (POS) terminals and for use in transaction terminal test systems. The platform includes a support frame for removably securing a POS terminal. To perform testing, the platform includes a card insert assembly mounted on the support frame and including a smartcard interposer coupled to an actuated mechanism operable to insert and withdraw the smartcard interposer from a card slot of the POS terminal. For additional testing functionality, the platform includes a card swipe emulator assembly mounted on the support frame. The card swipe emulator is coupled to a magnetic stripe reader of the POS terminal and configured to generate timed and magnetic pulses that emulate a magnetic stripe read by the magnetic stripe reader. Further testing capabilities are provided by a card tap to pay assembly mounted on the support frame, and this robotic test assembly or component includes a robotic device configured to move one or more transaction input components into and out of read proximity of a tap reader of the POS terminal. Further, the platform includes a data entry assembly, which is mounted on the support frame, that is made up of a three-axis mechanical actuator operable to physically interact with a keypad or a touchscreen of the POS terminal to activate keys at defined positions of the keypad or interact with the touchscreen.

In some preferred embodiments, the support frame with the card insert assembly, the card swipe emulator assembly, the card tap to pay assembly, and the data entry assembly is sized and shaped for insertion into a drawer (or shelf as these terms may be interchanged herein) of a server rack. In such embodiments, the server rack may include an exterior door, with a first lock, that is positionable to enclose the drawer and additional drawers of the server rack, and the server rack further may include an interior door, with a second lock, configured to provide selective access to the drawer and the additional drawers.

In the same or other embodiments, the platform may also include an optical code emulator mounted on the support frame. This emulator may include a display device (e.g., an LCD or the like) operable to display an optical code in a viewing position with respect to an optical code scanner of the POS terminal. The optical code displayed may be a barcode or a QR code. The display device may take the form of a high-contrast E-ink display and a dedicated microcontroller configured to convert commands to display barcode symbology into graphical commands used by the high-contrast E-ink display to generate the barcode or QR code.

In some platform implementations, the three-axis mechanical actuator may include a tapper and stepper motors configured to provide movement to the tapper along the X, Y, and Z axes. In such implementations, the data entry assembly further may include a capacitive touch mechanism configured to interact with the touchscreen. In these and other implementations, the test platform may further include a power supply supported on the support frame and configured for coupling with a power input of the POS terminal. The automated test platform may then further include a terminal power controller configured to switch the power supply on and off to reset the POS terminal or to power off the POS terminal for a predetermined period. In these or other implementations, the platform may further include a motherboard wired to an external connection that is connected to a mechanical switch on a USB switching hub, whereby when the mechanical switch is closed control devices configured to control the automated test platform can be switched or reset.

DETAILED DESCRIPTION

Embodiments described herein are directed toward systems and methods for testing and validating operations of transaction terminals such as POS terminals or devices. A testing system may be made up of a single automated test platform of the present description or, as is more typical in use, a plurality of such platforms. The newly created platforms are configured to be rack mountable (e.g., in presently available and often used server racks), and a network of such racks filled with automated test platforms may be used to concurrently test, on an ongoing or 24/7 schedule, tens to hundreds of the transaction terminals, which each may differ in configuration (software and/or hardware).

Prior to describing useful components and configurations for an automated test platform and a test system with such platforms, it may be useful for the reader to understand that the components of the test platforms and test systems can be configured to support numerous functions or functional use cases. It will be understood that some of the components may be eliminated (or not operated actively) in some particular applications, such as one or more of the robotic testing assemblies of the automated test platform when the testing operations it performs are not required to test operations of a terminal. For example, when it is known that a magnetic stripe card will never be used in an application, that functionality and associated hardware can be eliminated to reduce cost and complexity. Alternatively, the modular nature of the implementations described herein are adaptable to new technology for both communications interfaces and user interface components, which may be added and combined with the specific implementations described herein.

Exemplary functional use cases include: (a) testing payment terminals: (i) EMV card insert, swipe, and tap transactions, (ii) automated operator input of PIN entry and touchscreen, (iii) QR and/or barcode scanning, and (iv) load/wear testing of contacts and buttons; (b) testing POS use cases: (i) discount and coupon scenarios, (ii) split payment (card and cash or the like), (iii) refunds and exchanges, (iv) gift card balance and funding, and (v) card credit application; and (c) testing integrations with external systems: (i) till management for QSR/bar locations, (ii) kitchen display and printer updates for TSR order entry, (iii) generation of test data for FIT (Financial Integration Testing) validation, (iv) cash drawer integration, (v) weight scale integration, and (vi) printer testing.

Figure 1:
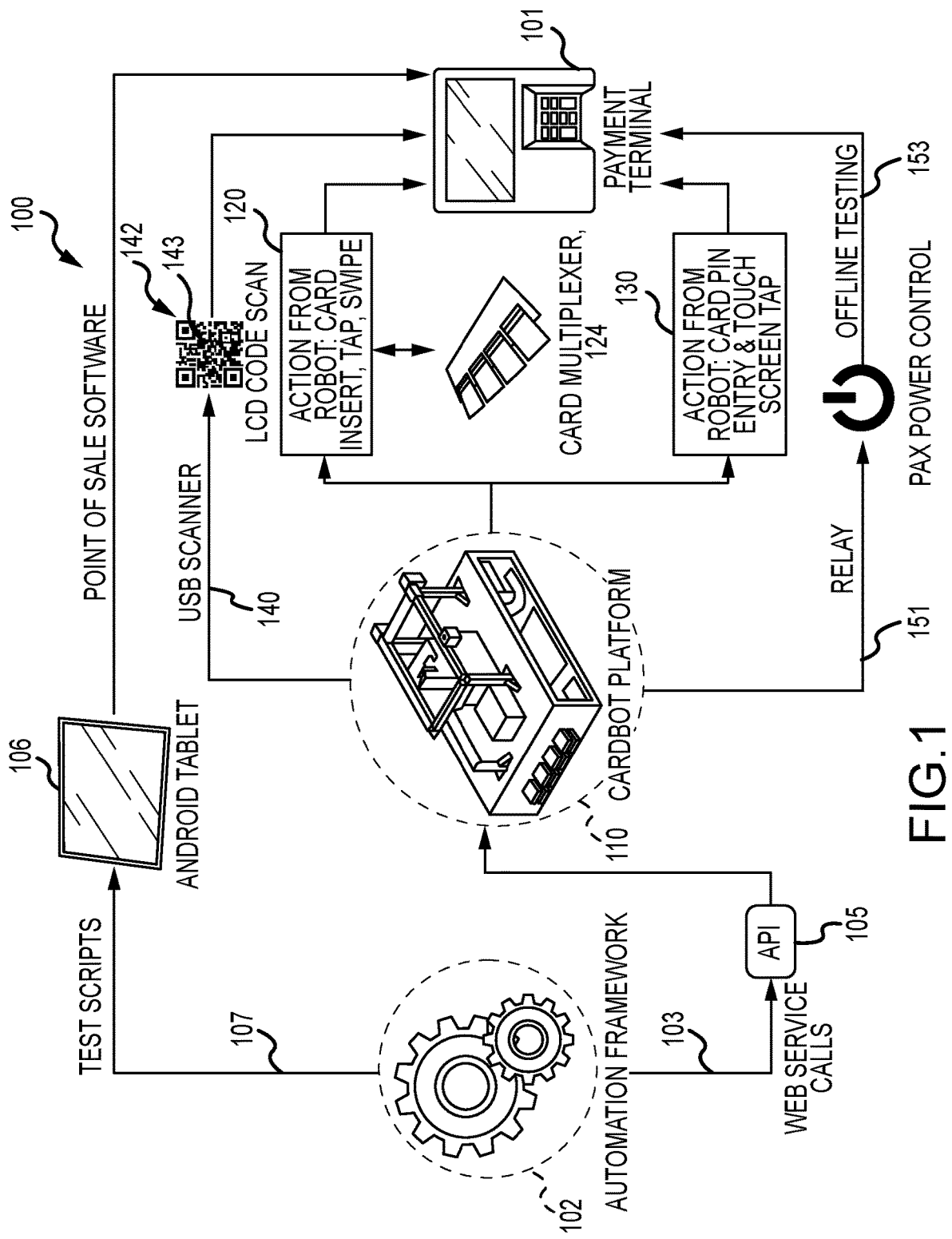
FIG. 1 is a functional block diagram of a portion or node of a terminal testing system shown operations and components, including an automated test platform, in accordance with the present description.
Figure 2A:
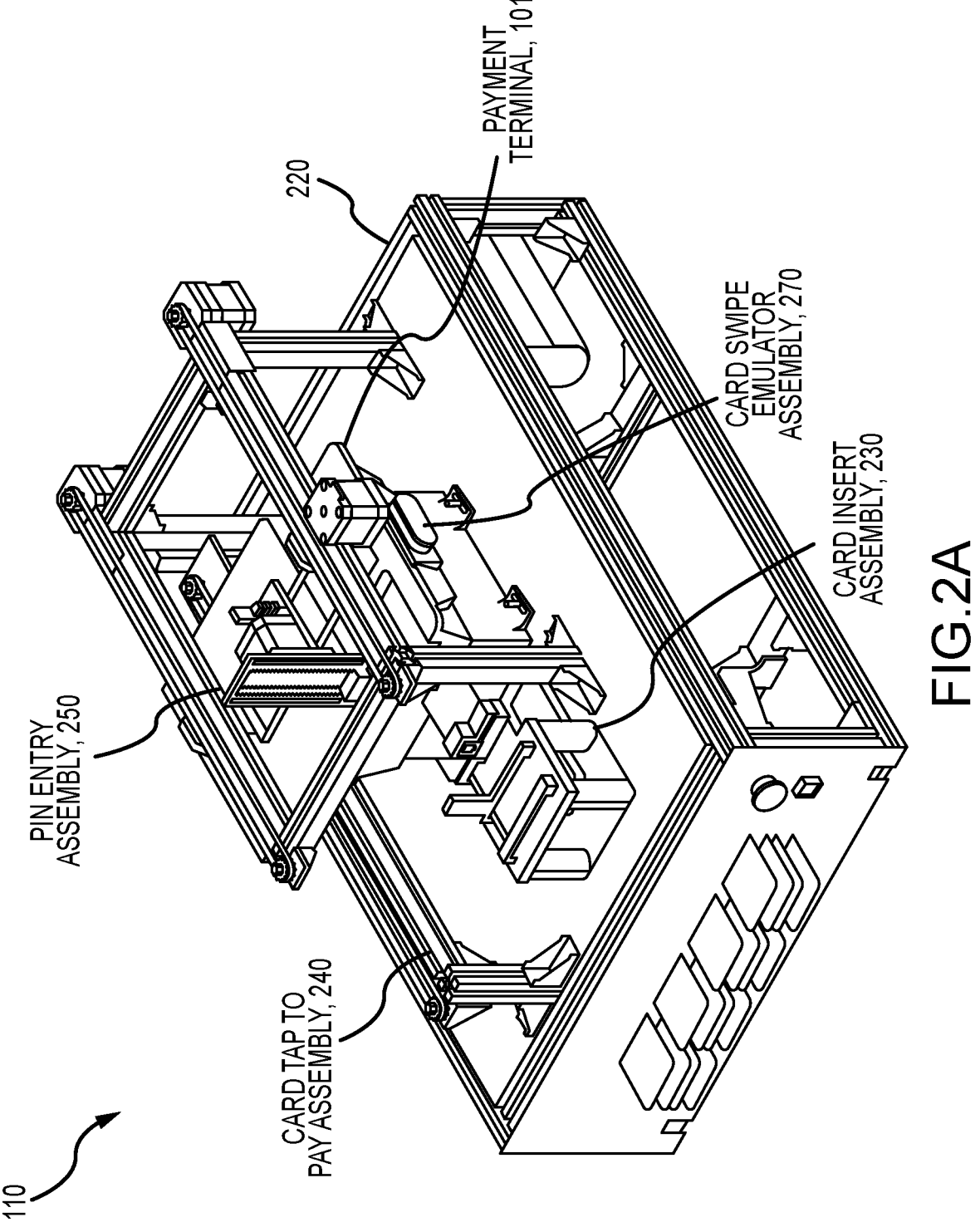
FIGS. 2A-2C illustrate an automated test platform (showing its robotic test assemblies and mechanical components), a set of the automated test platforms mounted within a server rack, and the server rack in an open state with a server rack sliding drawer extended outward of the present description all of which may be used in the system of FIG. 1.
Figure 2B:
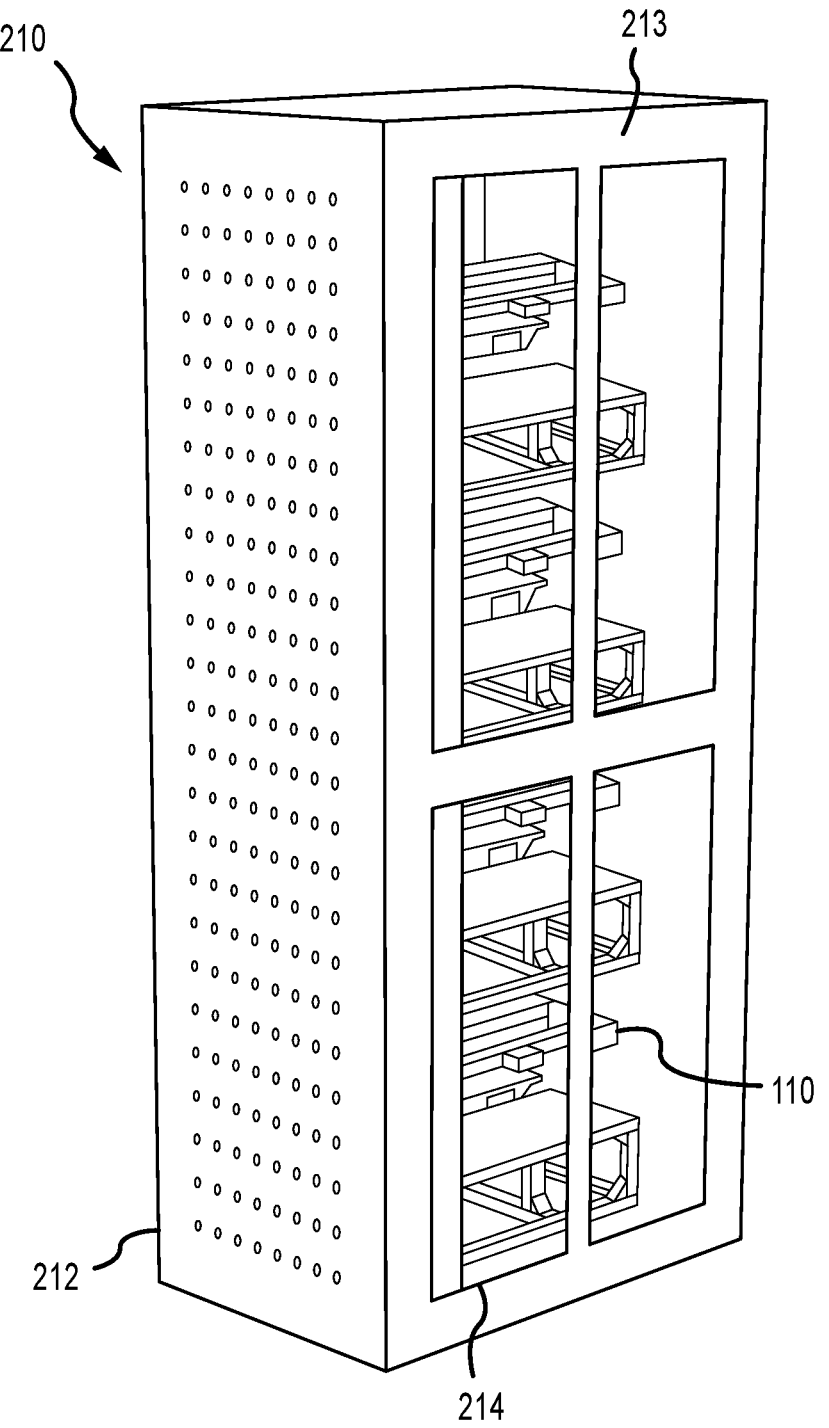

Turning now to exemplary embodiments and components, FIG. 1 shows a portion or node of an automated test system 100 of the present description, with it being a portion or node as it only includes one automated test platform (or CardBot platform as shown in FIG. 1) 110 whereas a full system 100 typically including two-to-many platforms 110 positioned in server racks (not shown in FIG. 1 but shown in FIG. 2B). The portions or nodes of a system 100 would be independently and concurrently operable by a controller and its software, which may be thought of as coordinating operations of the automation framework 102 (and its software and hardware). The platform 110 is labeled "CARD-BOT" platform in FIG. 1, and it should be understood that "CARDBOT" may be a trademark or registered trademark in the United States and other countries.

During use, a transaction or payment terminal 101 is mounted on or supported/retained by the platform 110, and the robotic or testing assemblies of the platform 110 are operated by the automation framework 102 to perform operational and validation testing of the terminal 101 in an automated manner. The automated framework module or component 102 is a computer-implemented system (e.g., a processor(s) that accesses memory/data storage to execute code or instructions to perform the functions described herein) that generates commands to control actuators and components of the automated test platform 110. These communications may be web service calls 103 communicated to the platform 110 (or its robotic test assemblies) via an application programming interface (API) 105 built to communicate with the automation framework 102 and the automated test platform 110.

Additionally, the system 100 is shown to include a test script or test monitor component or device 106 configured to communicate (in a digital wired or wireless manner) with the automation framework 102 and the POS or transaction terminal 101 undergoing testing. The device 106 may take the form of nearly any computing device such as a tablet or pad (with an Android tablet shown in FIG. 1). Automation framework 102 includes one or more software programs or routines that are configured to cause the framework 102 to generate and communicate test scripts 107 to the terminal 101 to implement a battery of tests on the POS terminal 101, and these scripts are coordinated by the framework 102 with the actuation commands 103. As shown in system 100, the test scripts 107 are provided to the terminal 101 through the monitor device 106, which is configured to provide a graphical user interface (GUI) for a human operator or administrator (not shown in FIG. 1) who manages the test operations performed by the system 100 (or system node 100).

As will become clear through the discussion of the robotic test assemblies or mechanisms of the platform 110, the automated test platform 110 is configured to provide various test inputs or stimulus patterns to the POS terminal 101 to test aspects of its current operations. These test inputs or stimulus patterns may include, as shown at 120 (with input from a card multiplexer 124), smartcard (e.g., an EMV card or the like) insertion, tap, or swipe. The test inputs or stimulus patterns may also include, as shown at 130, emulated human input applied to a mechanical or touchscreen keypad of the terminal 101. The stimulus patterns or test input may be applied alone or in coordination with each other in a manner that emulates the timing and ordering of events that are expected by the POS terminal 101 to a replicate a typical transaction (e.g., one of the use cases discussed above).

In some useful or preferred implementations, the automated test platform 110 includes test assemblies or is otherwise configured to provide other test input to the POS terminal 101 such as an optical scan of a QR code, a bar code, or the like as shown with output of a USB scanner 140 driving an LCD 142 to display a code (QR shown) 143 for scanning by the terminal 101. In other cases, test input may include power controls of the terminal 101 or devices it is simulated to be in communication with as shown in system 100 with relay communications 151 from platform 110 driving a power control 152 for the terminal 101 to achieve offline testing 153.

Figure 2C:
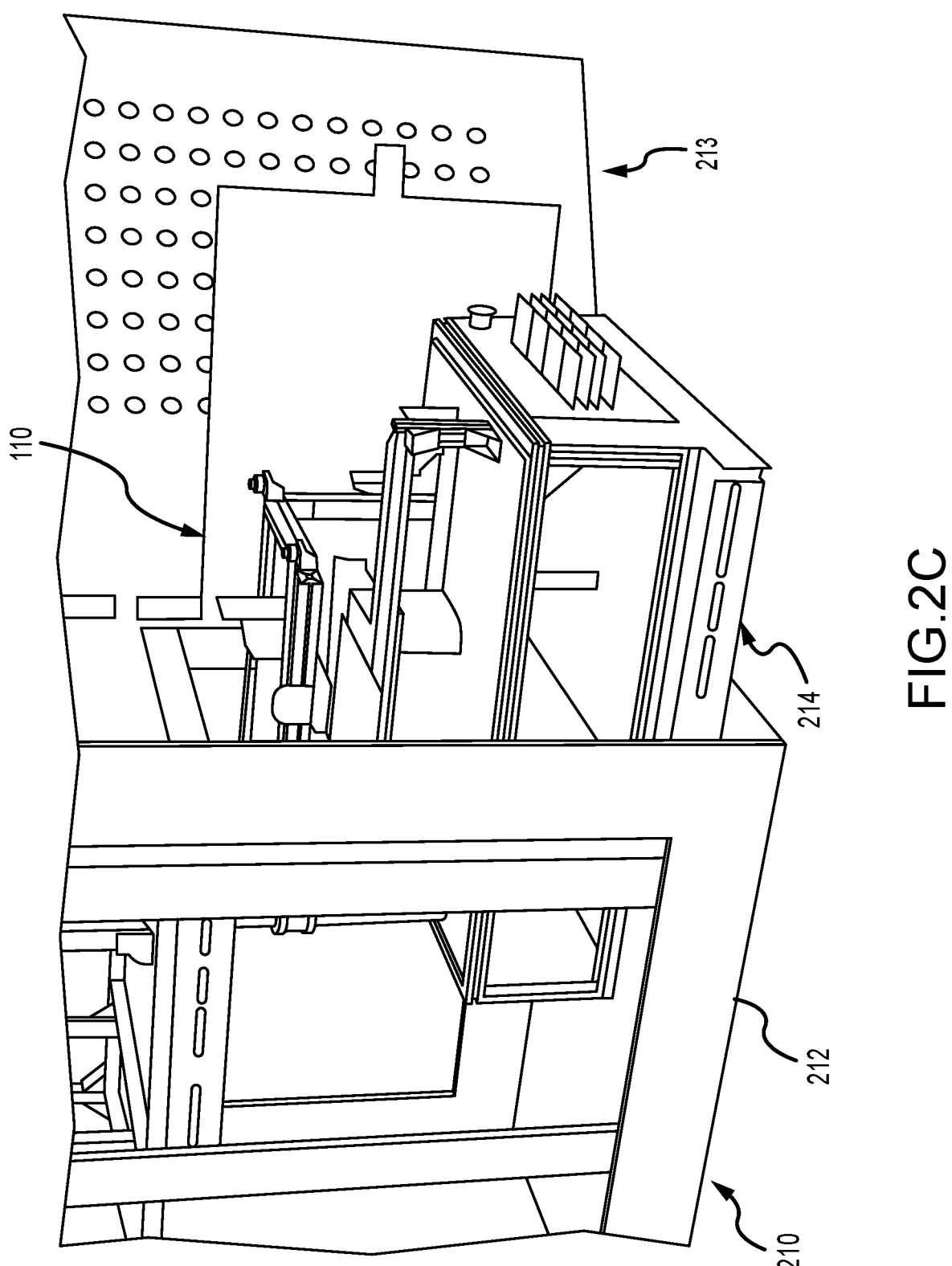

FIGS. 2A-2C illustrate, respectively, an automated test platform 110 (showing its robotic test assemblies and mechanical components useful for mounting it within a server rack drawer and for supporting a tested terminal 101 in FIG. 1), a set of the automated test platforms 110 mounted within drawers of a server rack 210, and the server rack 210 in an open state with a server rack sliding drawer extended outward as taught by the present description and all of which may be used in the system 100 of FIG. 1.

As shown in FIG. 2A, the automated test platform 110 includes a support frame 220 adapted for supporting the robotic test assemblies and for coupling with a server rack sliding drawer (e.g., drawer 214 shown in FIG. 2C in the out or extended position supporting the platform 110 via coupling with the frame 220). The support frame 224 is configured for adjustable mounting of the transaction terminal 101, which may vary in size and shape. The support frame 220 is also used to position the terminal 101 relative to the robotic test assemblies, one or more of which may be affixed to the support frame 220 (as seen in FIG. 2A). For automating the testing of a terminal, the robotic test assemblies include a card insert assembly 230, a card tap to pay assembly 240, a pin entry assembly 250, and a card swipe emulator 270, and the operations and/or functionality of each is explained in more detail below.

The robotic test assemblies 230-270 provide a robotic platform 110 that is designed and/or specially configured to be provided on the support frame 220 to have specific dimensions and interfacing (power and communications with the assemblies 230-270 and a terminal 101 mounted thereon) to allow housing the entire unit/platform 220 in standard server rack storage systems (such as server rack 210 shown in FIGS. 2B and 2C). In one prototyped implementation of the platform 110, server rack storage allows for robotic platforms 110 to be vertically stacked in a self-contained storage rack or rack system 210. The self-contained storage system 210 is useful for complying with industry safety standards and for providing compact, high-yield production output with a test system (such as system 100 of FIG. 1). Major mechanical components of the system may include (with each discussed in more detail below): (a) server rack storage (as shown in FIGS. 2B and 2C); (b) safety mechanisms; (c) an EMV card insert component; (d) a tap to pay component; (e) a magnetic swipe emulator; (f) PIN entry and touchscreen interaction; and (g) a QR and/or barcode scanner test component.

As shown in FIG. 2B, the robotic test platform 110 is designed (sized and shaped/spatially arranged) for mounting within a drawer (or shelf) of a standard server rack 210. The server rack 210 may include a frame or body 212 and a hinged (or removable) door 213, which enclose four shelves or drawers. Each of these shelves or drawers may have minimum unit dimensions of 24 inches by 16 inches (e.g., length by width). FIGS. 2B and 2C show a self-contained system in rack 210 of four robotic or automated test platforms 110 that are each mounted on a sliding drawer mechanism 214. FIG. 2C shows the drawer mechanism 214 in a fully extended position, which allows for operators to easily perform machine maintenance or routine inspections and to place and remove a terminal 101 for testing upon or off the frame 220. In one exemplary implementation, each of the automated test platforms 101 in the rack 210 is connected via a USB serial connection to a general purpose or special purpose "host" computer/controller, which executes software operable or configured to distribute any incoming transactions to an available robotic platform 110. This allows two to four (or more when additional racks 210 with platforms 110 are in a test system 100) transactions to be performed in parallel, which decreases the overall amount of time it takes to get through a particular test suite.

Figure 3:
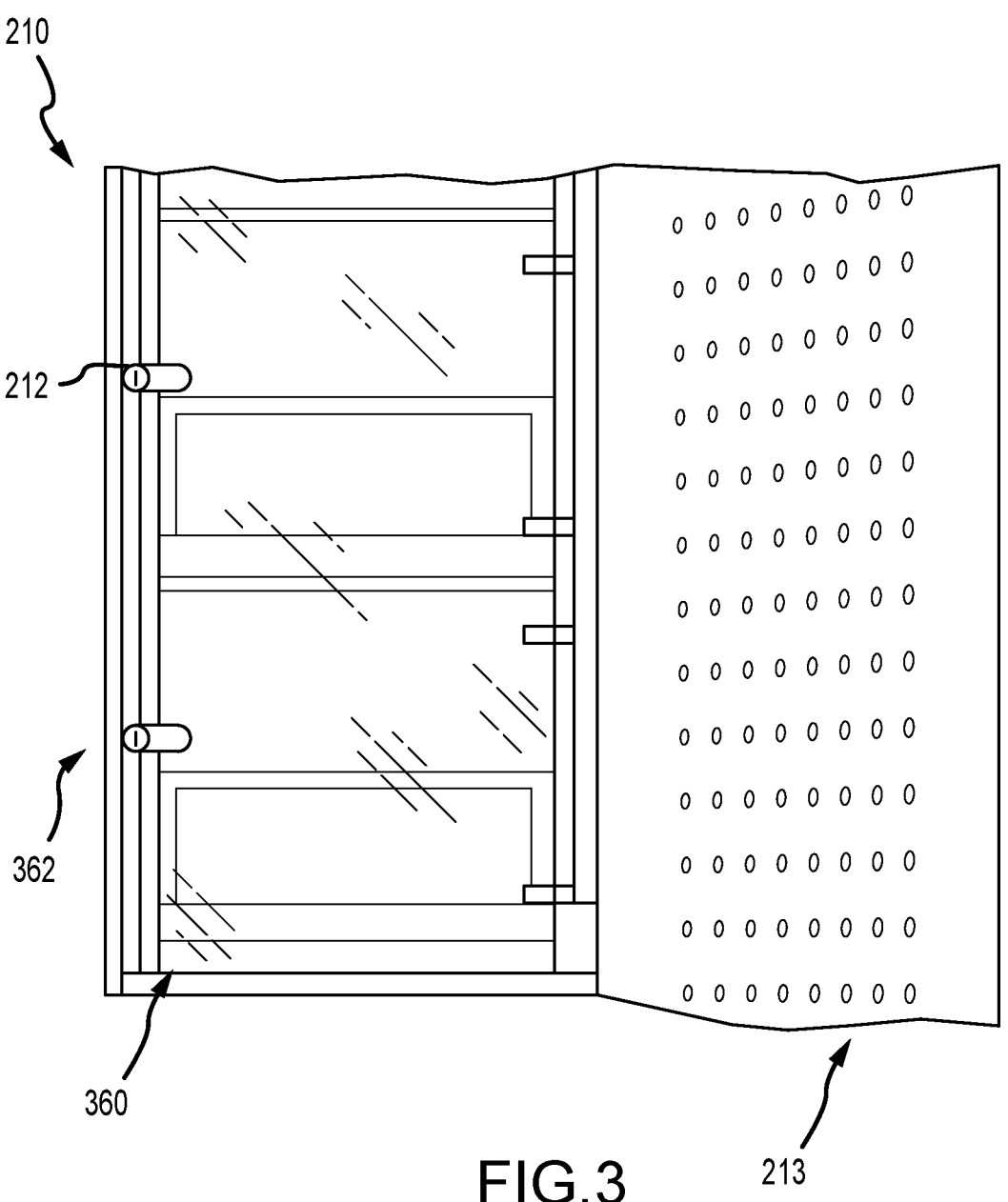
FIG. 3 illustrates the server rack of FIGS. 2B and 2C with the outer door open to show an interior safety door in a closed and locked position.

FIG. 3 illustrates the server rack 210 of FIGS. 2B and 2C with the outer door 213 open to show inclusion of an interior safety door 360 in a closed and locked position. As shown, the server rack storage system 210 is configured to prohibit unauthorized personnel from accessing the robotic platforms in the drawers/shelves. This can be achieved by way of an exterior locking mechanism on the door handle of exterior door 213. Further, the storage system 210 is designed to protect system authorized operators via an interior safety component. Particularly, as shown in FIG. 3, each robotic platform 110 is equipped with an interior safety lock 362 (e.g., a magnetic safety lock or the like) attached to an interior safety door 360 (inward from the outer door 213 and that may take the form of a plexiglass or other durable (and sometimes transparent or at least translucent) material). When the lock 362 takes the form of a magnetic safety lock, it may be hardwired into an emergency stop switch of the corresponding platform 110. Then, if the interior door 360 is opened, power will be automatically shut off to that corresponding robotic platform 110. This allows an operator to perform machine maintenance or inspections without risk of harm, while not disrupting the operation of the other robotic test platforms 110 in the self-contained system 210.

Figure 4:
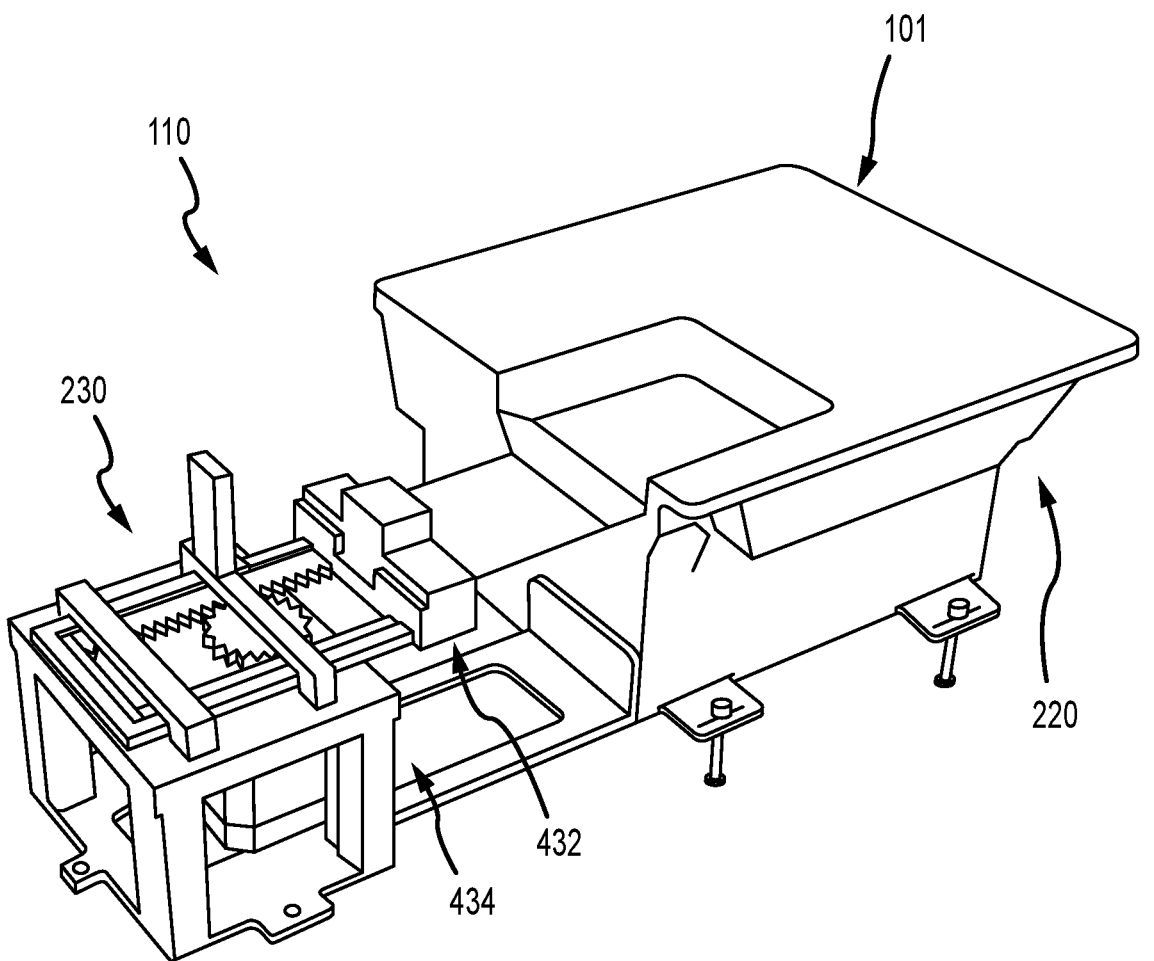
FIG. 4 is a partial top perspective view of the automated test platform of FIGS. 1 and 2A with a terminal mounted on the support frame for testing and showing the card insert assembly in more detail.

FIG. 4 is a partial top perspective view of the automated test platform 110 of FIGS. 1 and 2A with a POS or transaction terminal 101 mounted on the support frame 220 for testing of its operations. Specifically, FIG. 4 is useful for showing the EMV card insert component or assembly 230 in greater detail. The robotic platform 110 is equipped with the capabilities of performing a physical card insert transaction on a payment terminal device 101 via operations of the EMV card insert assembly 230. Particularly, the assembly 230 includes a smart card interposer 432 attached to a mechanical drive component or mechanism 434 configured to operate to allow for different card signatures to be tested without physically changing the card. The drive component 434 is composed, in one embodiment, of a NEMA 17 stepper motor operable in response to control signals from the automation framework 102 to drive a rack and pinon. The insert component 432 can be configured to utilize an optical sensor for the homing sequence to allow for consistency in the card's position during operation of the assembly 230. FIG. 4 shows the EMV card insert component 432 attached to a PX7 payment terminal 101, but it will be understood that the assembly 230 is configurable to work with nearly any transaction terminal or device.

Figure 5:
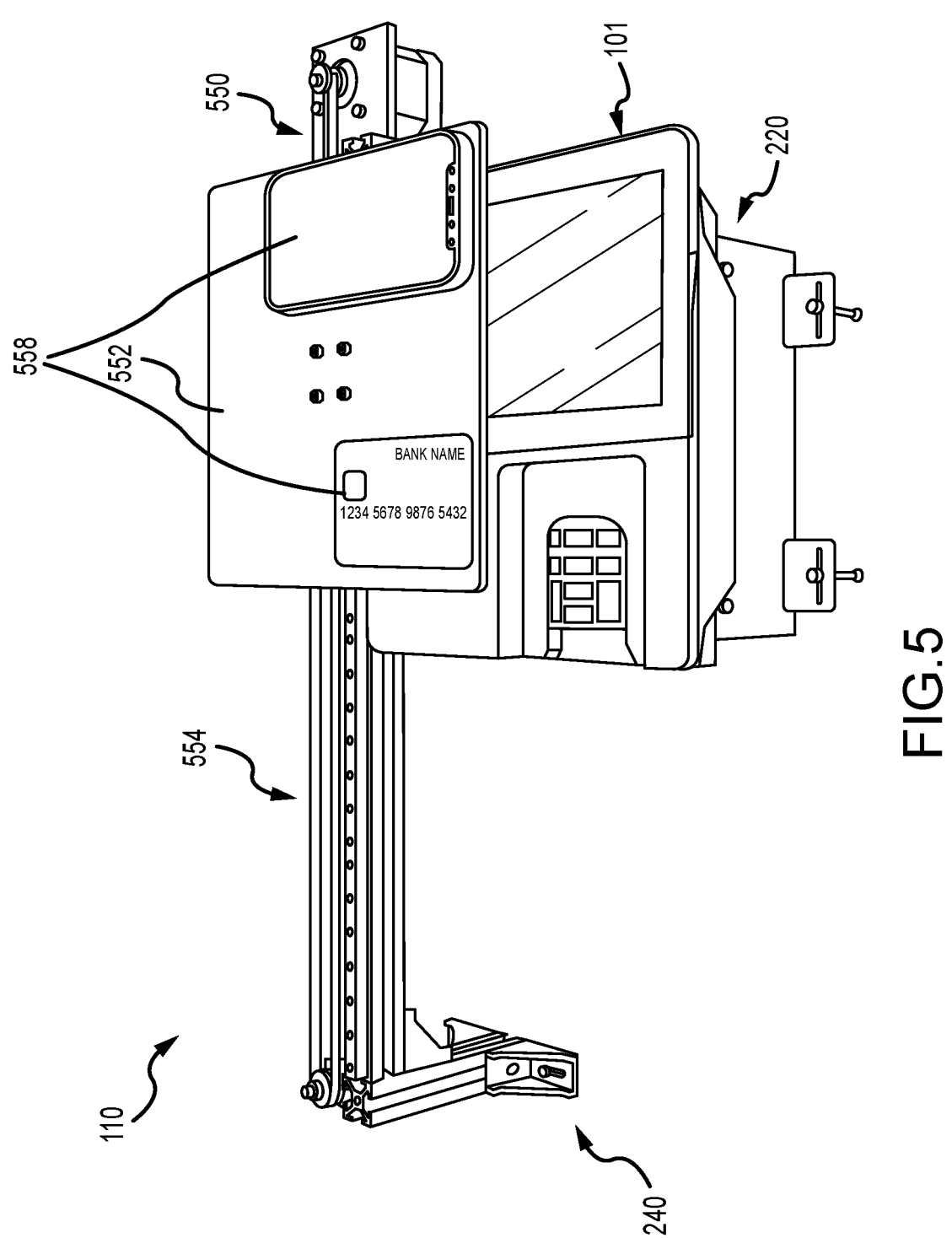
FIG. 5 is a partial top perspective view of the automated test platform of FIGS. 1 and 2A with a terminal mounted on the support frame for testing and showing the tap to pay assembly in further detail.

FIG. 5 is a partial top perspective view of the automated test platform 110 of FIGS. 1 and 2A with a POS or similar terminal 101 mounted on the support frame 220 for testing and showing the tap to pay assembly 240 in further detail. As shown, the robotic test platform 110 may include a tap to pay component or assembly 240 configured to perform a physical tap-to-pay transaction with payment terminal devices such as terminal 101. To this end, the assembly 240 may include a drive component 550 that drives, such as with a NEMA 17 stepper motor or the like as the drive component 550, a belt and pulley system. A plate 552 (e.g., an acrylic plate or the like) is attached to the drive component 550 and translates (e.g., moves in a linear manner) on a linear rail 554 to position the requested payment type 558 (e.g., a card, a smartphone screen, or the like) over the payment terminal 101 and its EMV reader, as well as to ensure the assembly 240 does not interfere with operational usage of the automated test platform 110. As with FIG. 4, the terminal 101 shown being tested may be a PX7 terminal but the assembly 240 is configurable to work with nearly any POS or similar terminal device.

Figure 6:
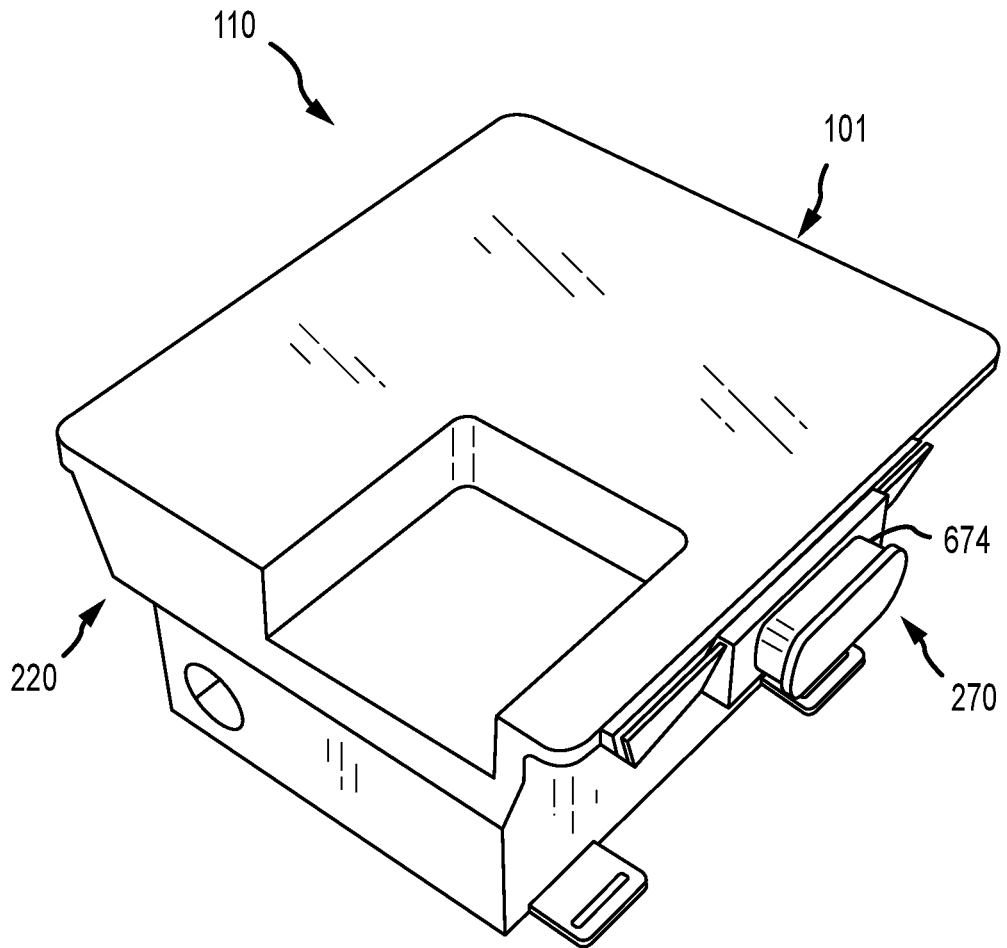
FIG. 6 is another partial top perspective view of the automated test platform of FIGS. 1 and 2A with a terminal mounted on the support frame for testing and showing the magnetic swipe emulator assembly in additional detail.

FIG. 6 is another partial top perspective view of the automated test platform 110 of FIGS. 1 and 2A with a POS terminal 101 mounted on the support frame 220 for testing and showing the magnetic swipe emulator assembly 270 in additional detail. The robotic test platform 110 is equipped with the capabilities of emulating a physical card swipe transaction with payment terminal devices such as terminal 101. As shown, the card mag swipe component or assembly 270 is mounted with a magnetic pulse generator 674 of the assembly 270 proximate to the card swipe mechanism of the terminal 101. The assembly 270 is configured to send magnetic pulses at specific intervals to the generator 674 (e.g., a coil), which allows the "play back" of the data that is normally stored as bits encoded on the magnetic stripe of a physical card. These bits are then interpreted by the terminal 101 such as with its magnetic read head (common in a PAX device) as Track ½ payment data.

Figure 7:
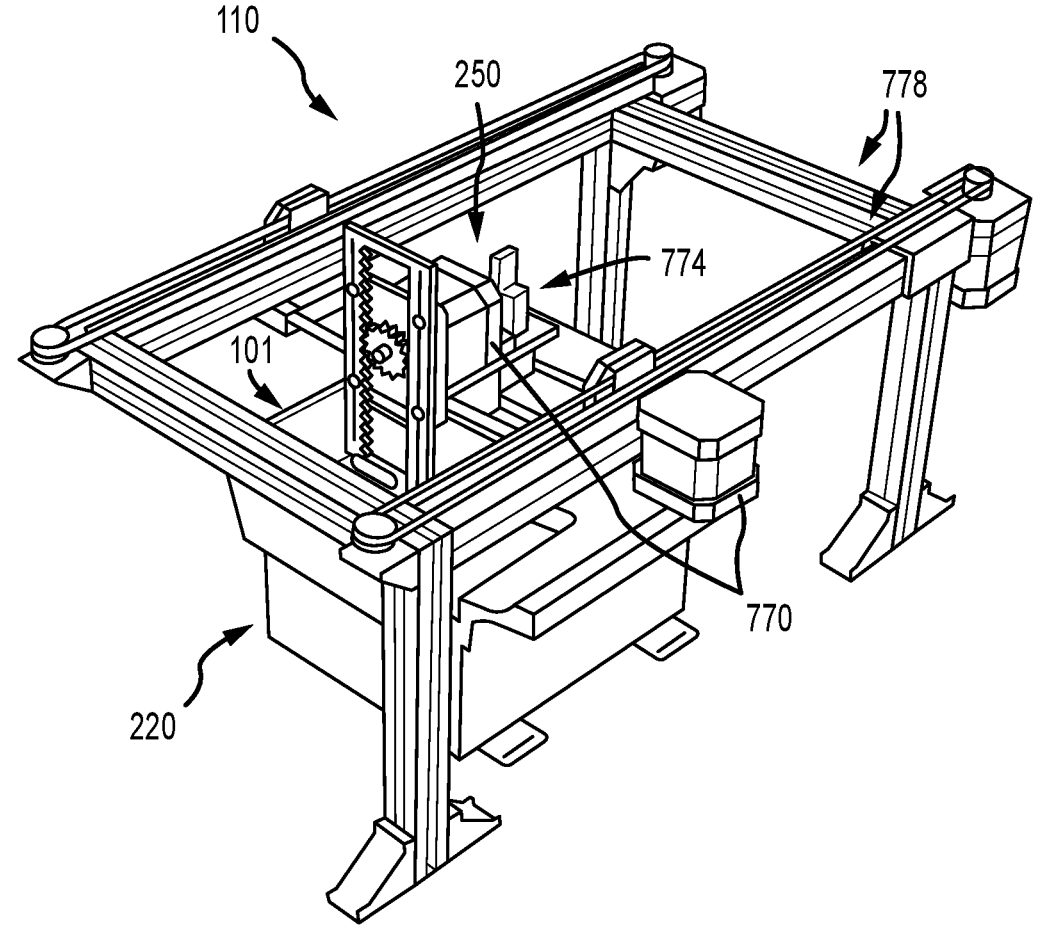
FIG. 7 is an additional partial top perspective view of the automated test platform of FIGS. 1 and 2A with a terminal mounted on the support frame for testing and showing the XYZ tapper assembly in further detail.

FIG. 7 is an additional top perspective view of the automated test platform 110 of FIGS. 1 and 2A with a terminal 101 mounted on the support frame 220 for testing and showing the XYZ tapper assembly or component 250 in further detail. The robotic test platform 110 is configured, with assembly 250, to perform physical PIN entry on the terminal 101 to exercise a mechanical or touchscreen interaction. The tapper component or assembly 250 may use motors/drivers (e.g., NEMA 17 stepper motors or the like) 770 to provide movement to a tapper 774 along the X, Y, and Z axes via rails 778. The assembly 250 is also preferably configured to be capable of producing a capacitive touch allowing interaction with a touchscreen of the POS or other payment/transaction terminal 101.

Figure 8:
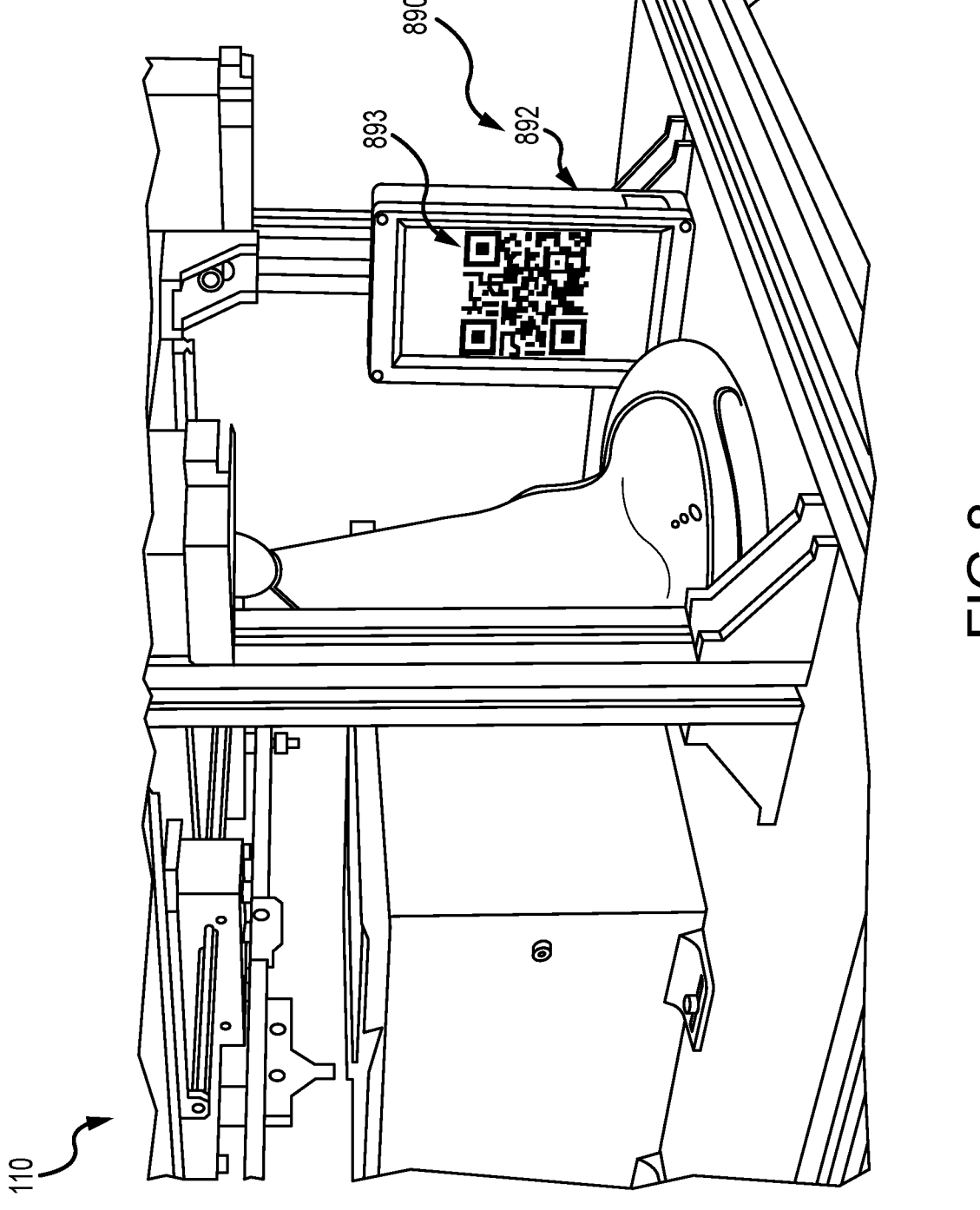
FIG. 8 is a partial side view of the automated test platform of FIGS. 1 and 2A showing a code scanner assembly or component for displaying a QR or barcode to a terminal being tested.

FIG. 8 is a partial side view of the automated test platform 110 of FIGS. 1 and 2A showing a code scanner assembly or component 890 for displaying a QR or barcode 893 to a terminal being tested. The terminal 101 would be mounted on the support frame 220 (as shown in prior figures) relative to the assembly 890. The test platform 110 with the assembly 890 is equipped with a USB scanner to enable transactions to be tested that require barcode or QR codes or other optical code inputs to the terminal 101. Internally, software is provided that is configured to display on display device 892 (e.g., an LCD display device or the like) codes 893 to the terminal 101 such as multiple barcode symbologies as needed (e.g., Code39, Code128, or QR codes).

Figure 9:
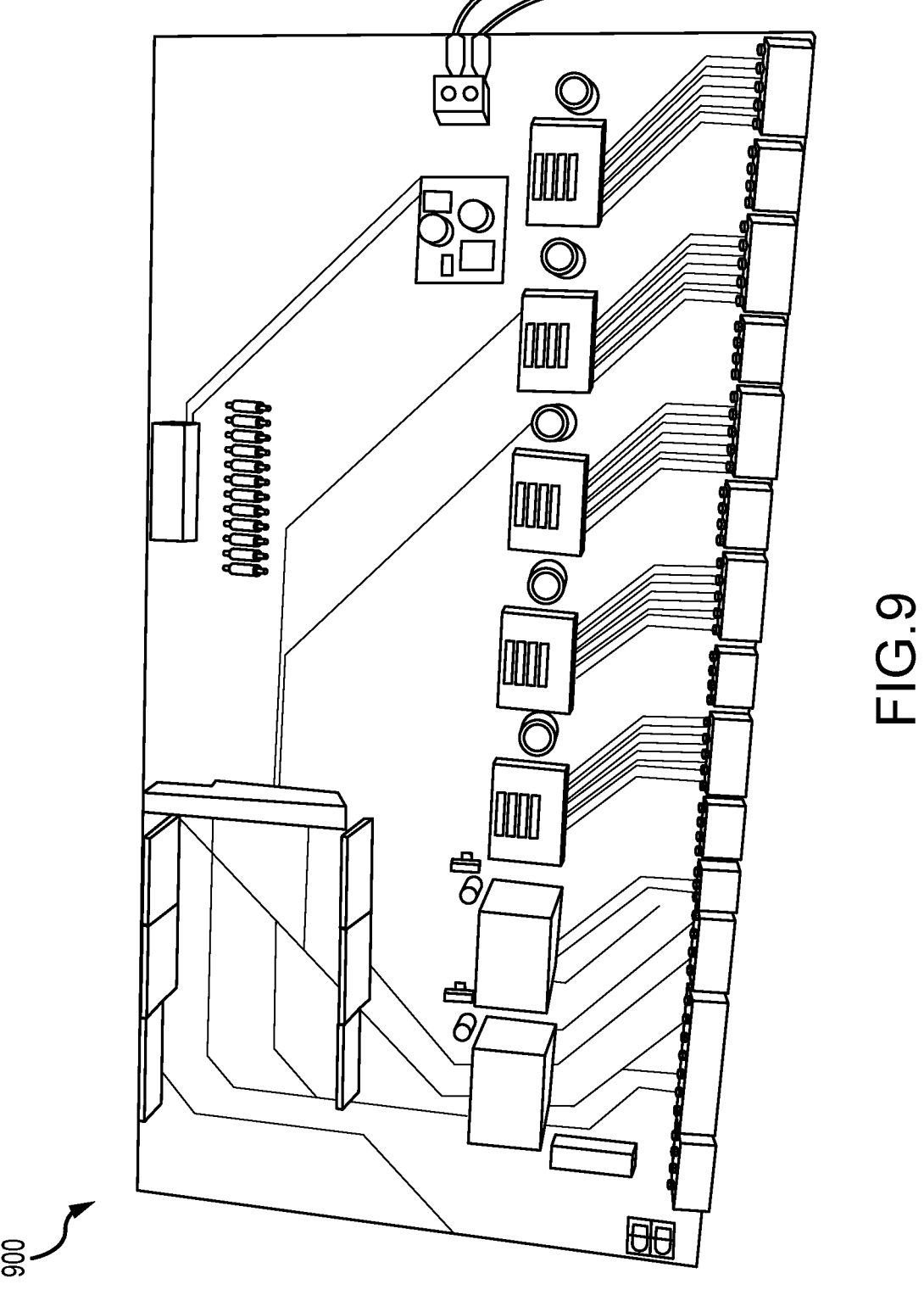
FIG. 9 illustrates computing hardware used in implementations of the test system of the present description.
Figure 10:
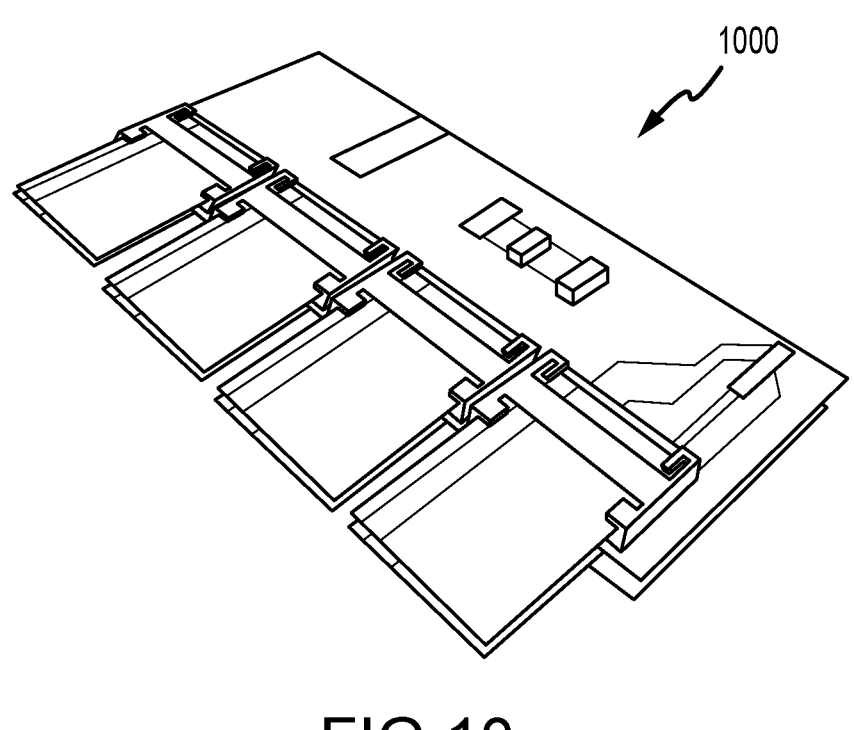
FIG. 10 shows an example input section of a card multiplexer that may be used in a test system of the present description.
Figure 11:
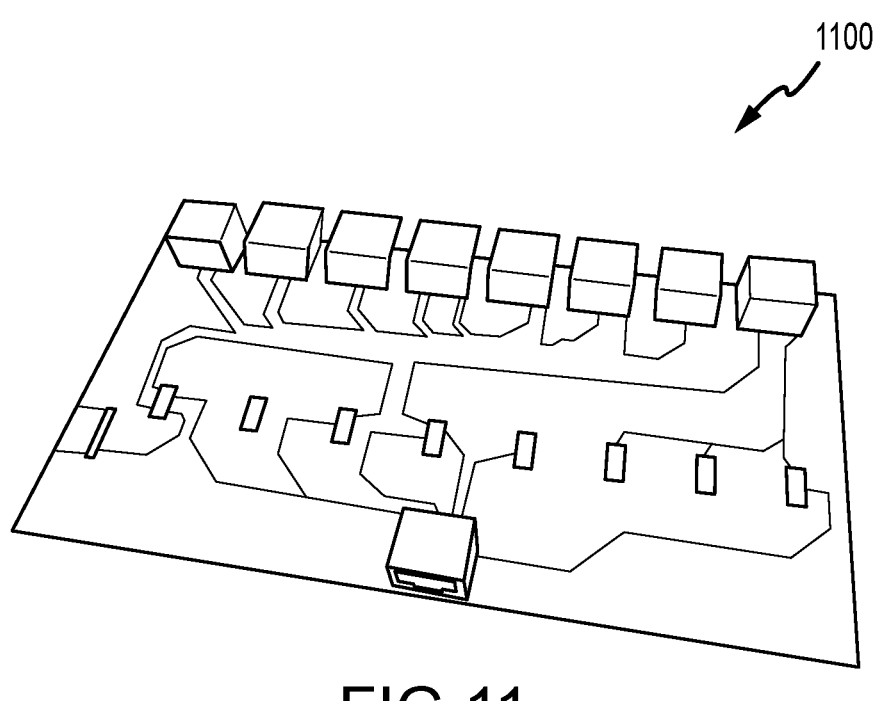
FIG. 11 illustrates a meta-multiplexer that may be included in a test system of the present description.

FIGS. 9-11 illustrate useful electrical and/or computing components of a particular implementation of the test system 100 and platform 110 of FIG. 1. One important electronic component is a motherboard, which may take the form shown at 900 in FIG. 9, that is configured to implement the computational resources used to provide the functions of the test system 100 described throughout this description. The motherboard 900 may include memory, a CPU, communication buses, and I/O controllers to operate to control the entire robotic test platform 110. In a particular implementation, an Atmel-based microcontroller receives serial commands over USB and then converts those commands into electronic signals used to move one or more stepper motors, display a barcode or QR code, send magnetic pulses, and so on via operation of one or more of the robotic test assemblies or subsystems. More generally, the electronic components of the test system 100 and its test assemblies the motherboard, motor control(s), a card multiplexer, a payment device/terminal power control, a USB switcher, an LCD display, and the magnetic swipe emulator.

In one embodiment, the motherboard 900 shown in FIG. 9 is a custom printed circuit board that serves as a condensed hub of connections allowing for communications to all subcomponents of the electronic system. It is connected to the robotic test platform 110 via several removable connectors, which allows subsystems or test assemblies to be replaced or modified to work with different payment terminal or system hardware and which also allows for future expansion. The motor control subsection of the motherboard 900 may include several A4998 stepper motor drivers and their related power-handling electronics. These drivers receive signals from the processor of the motherboard 900 and convert them into electrical pulses sent in a particular order to cause the stepper motors' magnetic coils to be energized. When the coils are energized in the right order, the stepper motor then turns a set number of degrees in the desired direction. The stepper motors can be connected to removable connectors on the motherboard 900, allowing them to be replaced as needed.

The card multiplexer 1000 shown in FIG. 10 is configured to combine and transmit signals from one of several payment cards into a card interposer. The card interposer is inserted into the card reader, as discussed above, on the terminal 101. In a particular implementation there can be up to sixty-four different cards used as inputs to a single smart card as the output. FIG. 10 shows a portion of the card multiplexer 1000 that houses eight smartcard sockets. Any number of cards can be used to meet the needs of a particular application. In this manner, a variety of smart cards can be used to improve test coverage without the need to physically transport each of the smartcards as the interposer is the only device that needs to physically interact with the POS terminal's interfaces. FIG. 11 illustrates a meta multiplexer 1100 in the form of a custom circuit board that is configured to combine the signals from one or more card multiplexers to allow any combination of eight to sixty-four (or more) payment options in batches of eight. The boards 900-1100 are interconnected, in some cases via CAT 5 cables to simplify connections and provide a positive locking force.

With regard to the terminal power control feature of the test system 100, a socket on the motherboard 900 shown in FIG. 9 is provided to allow for a 12 Volt or other appropriate power supply to be inserted. This power is switched on or off via an electromechanical relay on the motherboard 900. The microprocessor of the board 900 is configured to send signals to this relay to set the power state. The power is then output via a connector on the motherboard 900 and connected to the power input on the POS terminal 101. By toggling the power off and then on, the robotic test platform 110 using the motherboard 900 can effectively reset the POS terminal or payment device 101 being tested. Alternatively, the robotic test platform 110 can be operated to keep the power off on the terminal 101 for a set period, thereby simulating a scenario where the terminal 101 is unable to communicate with the attached tablet 106 or backend payment services. This functionality is useful in testing the overall system's handling of offline or degraded connections.

An additional relay provided on the motherboard 900 shown in FIG. 9 is wired to an external connector, which is then connected to the mechanical switch on a USB switching hub. When a signal is provided by the microcontroller of the board 900, the relay closes momentarily, which, in turn, closes the switch on the USB switching hub. This allows the tablet 106 connected to the hub to be switched between the tablet 106 and the host computer. A connection to the host machine/computer is needed when the table 106 is reset to restore the ADB (Android Debug Bridge) connection. This saves the users of the test system 100 from having to change cable connections when the system 100 is reset.

With regard to the LCD display used to provide bar codes and QR codes, a serial command signal can be produced by the motherboard 900 and exposed via an external connector. This connector is then wired to the LCD display module of the platform 110, which may take the form of a high-contrast E-ink display with a dedicated microcontroller. The LCD microcontroller is configured to convert the commands to display a particular barcode symbology (barcode, QR code, or the like) and barcode data into the graphical commands necessary to "draw" the barcode. Once the image data is prepared, the LCD microcontroller sends the data over an SPI bus connection to drive the display device for display to the terminal 101.

With regard to magnetic swipe emulation, an H-bridge motor driver chip is implemented on the motherboard 900, connected to an external connector. Based on pulses from the motherboard's microcontroller, the H-bridge chip energizes one of two channels. These channels are connected to a magnetic coil in the magnetic swipe emulator. When engaged, the flow of energy between channels changes the direction of magnetic flux in the coil, which simulates the signal that the magnetic read head would normally receive when dragging the magnetic stripe of a physical card through the reader. This "tricks" the magnetic read head of the terminal 101 to interpret the pulses as data. When the magnetic pulses are received in a specific timing and order, the payment device or terminal 101 interprets this as a swipe payment.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, this description used POS systems and their terminals as specific examples of transaction terminal that were tested using the new automated test platform, POS systems are similar to other systems that use a terminal to obtain information from a user to support transactions, admissions, security processes, and entitlements. Accordingly, the term "transaction terminal" is intendent to include POS terminals and other terminals, and some of the techniques and devices described herein can readily be applied by those skilled in the arts to automated testing of these non-POS-type devices.

With regard to USB peripheral emulation, the CARDBOT platform, in some implementations, includes the ability to emulate certain USB-attached peripherals, such as the barcode scanner, cash drawer, and scale. These devices emulate the data communications protocol and messages that the original hardware would provide and appear to the attached POS tablet as if the actual hardware was connected. In particular, the USB emulated peripheral is connected to the CARDBOT motherboard via serial connection, and the state of the hardware is then controlled via the automation script. In this way, the automation script can perform a scenario such as "place a 1 pound weight on the scale". The motherboard will signal the USB scale emulator to send the appropriate signals to the POS tablet, and the tablet will react as if a real weight were placed on the scale, all without any physical shifting of any parts. Using these components instead of physical hardware speeds up the test process, reduces the number of moving parts to be maintained, and provides the ability to support a complex hardware setup in the same rack space.

With regard to load balancing, the CARDBOT platform software is in some embodiments configured to coordinate testing tasks between multiple CARDBOT rack instances.

This may be achieved by inclusion of a software service, exposed via a RESTful API that allows another software process to "request" a CARDBOT instance. The request can include specific requirements, such as a particular payment device or connected peripheral. The load balancing API will identify an instance that is not currently in use and meets the requirements and, if one is available, will return a session key. The requesting process may then interact directly with the CARDBOT instance for the duration of the session (default 30 minutes) by providing the key as part of the request to the CARDBOT API. The requesting process may extend the session if needed or may end the session early via RESTful API calls. While this session is valid, no other process can access the reserved CARDBOT instance.

I claim:

1. An automated test platform for testing point of sale (POS) terminals, comprising:
   a support frame for removably securing a POS terminal;
   a card insert assembly mounted on the support frame comprising a smartcard interposer coupled to an actuated mechanism operable to insert and withdraw the smartcard interposer from a card slot of the POS terminal;
   a card swipe emulator assembly mounted on the support frame, wherein the card swipe emulator is coupled to a magnetic stripe reader of the POS terminal and configured to generate timed and magnetic pulses that emulate a magnetic stripe read by the magnetic stripe reader;
   a card tap to pay assembly mounted on the support frame and comprising a robotic device configured to move one or more transaction input components into and out of read proximity of a tap reader of the POS terminal; and
   a data entry assembly mounted on the support frame and comprising a three-axis mechanical actuator operable to physically interact with a keypad or a touchscreen of the POS terminal to activate keys at defined positions of the keypad or interact with the touchscreen.

2. The automated test platform of claim 1, wherein the support frame with the card insert assembly, the card swipe emulator assembly, the card tap to pay assembly, and the data entry assembly is sized and shaped for insertion into a drawer of a server rack.

3. The automated test platform of claim 2, wherein the server rack comprises an exterior door, with a first lock, that is positionable to enclose the drawer and additional drawers of the server rack and wherein the server rack further comprises an interior door, with a second lock, configured to provide selective access to the drawer and the additional drawers.

4. The automated test platform of claim 1, further comprising an optical code emulator mounted on the support frame and comprising a display device operable to display an optical code in a viewing position with respect to an optical code scanner of the POS terminal.

5. The automated test platform of claim 4, wherein the optical code displayed is a barcode or a QR code.

6. The automated test platform of claim 5, wherein the display device comprises a high-contrast E-ink display and a dedicated microcontroller configured to convert commands to display barcode symbology into graphical commands used by the high-contrast E-ink display to generate the barcode or QR code.

7. The automated test platform of claim 1, wherein the three-axis mechanical actuator comprises a tapper and stepper motors configured to provide movement to the tapper along the X, Y, and Z axes and wherein the data entry assembly further comprises a capacitive touch mechanism configured to interact with the touchscreen.

8. The automated test platform of claim 1, further comprising a power supply, supported on the support frame, configured for coupling with a power input of the POS terminal, wherein the automated test platform further comprises a terminal power controller configured to switch the power supply on and off to reset the POS terminal or to power off the POS terminal for a predetermined period.

9. The automated test platform of claim 1, further comprising a motherboard wired to an external connection that is connected to a mechanical switch on a USB switching hub, whereby when the mechanical switch is closed control devices configured to control the automated test platform can be switched or reset.

10. An automated test platform for testing transaction terminals, comprising:
    a support frame for supporting a transaction terminal; and
    a data entry assembly mounted on the support frame and comprising a three-axis mechanical actuator operable to physically interact with a keypad or a touchscreen of the POS terminal to activate keys at defined positions of the keypad or interact with the touchscreen,
    wherein the support frame with the data entry assembly is physically configured for insertion in a drawer or shelf of a server rack.

11. The automated test platform of claim 10, wherein the three-axis mechanical actuator comprises a tapper and stepper motors configured to provide movement to the tapper along the X, Y, and Z axes.

12. The automated test platform of claim 10, wherein the data entry assembly further comprises a capacitive touch mechanism configured to interact with the touchscreen.

13. The automated test platform of claim 10, wherein the server rack comprises an exterior door, with a first lock, that is positionable to enclose the drawer and additional drawers of the server rack and wherein the server rack further comprises an interior door, with a second lock, configured to provide selective access to the drawer and the additional drawers.

14. The automated test platform of claim 10, further comprising a card swipe emulator assembly mounted on the support frame, wherein the card swipe emulator is coupled to a magnetic stripe reader of the POS terminal and configured to generate timed and magnetic pulses that emulate a magnetic stripe read by the magnetic stripe reader.

15. The automated test platform of claim 10, further comprising an optical code emulator mounted on the support frame and comprising a display device operable to display an optical code in a viewing position with respect to an optical code scanner of the POS terminal, wherein the optical code displayed is a barcode or a QR code.

16. The automated test platform of claim 15, wherein the display device comprises a high-contrast E-ink display and a dedicated microcontroller configured to convert commands to display barcode symbology into graphical commands used by the high-contrast E-ink display to generate the barcode or QR code.

17. The automated test platform of claim 10, further comprising a power supply, supported on the support frame, configured for coupling with a power input of the POS terminal, wherein the automated test platform further comprises a terminal power controller configured to switch the power supply on and off to reset the POS terminal or to power off the POS terminal for a predetermined period.

18. The automated test platform of claim 10, further comprising a motherboard wired to an external connection that is connected to a mechanical switch on a USB switching hub, whereby when the mechanical switch is closed control devices configured to control the automated test platform can be switched or reset.

19. An automated test platform for testing transaction terminals, comprising:

a card swipe emulator assembly mounted on the support frame, wherein the card swipe emulator is coupled to a magnetic stripe reader of the POS terminal and configured to generate timed and magnetic pulses that emulate a magnetic stripe read by the magnetic stripe reader; and an optical code emulator mounted on the support frame and comprising a display device operable to display an optical code in a viewing position with respect to an optical code scanner of the POS terminal, wherein the optical code displayed is a barcode or a QR code.

20. The automated test platform of claim 19, further comprising a power supply, supported on the support frame, configured for coupling with a power input of the POS terminal, wherein the automated test platform further comprises a terminal power controller configured to switch the power supply on and off to reset the POS terminal or to power off the POS terminal for a predetermined period.

21. The automated test platform of claim 19, further comprising a motherboard wired to an external connection that is connected to a mechanical switch on a USB switching hub, whereby when the mechanical switch is closed control devices configured to control the automated test platform can be switched or reset.

22. The automated test platform of claim 19, wherein the display device comprises a high-contrast E-ink display and a dedicated microcontroller configured to convert commands to display barcode symbology into graphical commands used by the high-contrast E-ink display to generate the barcode or QR code.

\* \* \* \* \*